US007021297B1

(12) United States Patent
Slingo

(10) Patent No.: US 7,021,297 B1
(45) Date of Patent: Apr. 4, 2006

(54) APPARATUSES, DEVICES, SYSTEMS AND METHODS EMPLOYING FAR INFRARED RADIATION AND NEGATIVE IONS

(76) Inventor: Fred M. Slingo, 20140 Park Hill, Barrington, IL (US) 60010

(*) Notice: Subject to any disclaimer, the term of this patent is extended or adjusted under 35 U.S.C. 154(b) by 147 days.

(21) Appl. No.: 10/065,149

(22) Filed: Sep. 20, 2002

Related U.S. Application Data

(63) Continuation-in-part of application No. 10/213,197, filed on Aug. 5, 2002, now abandoned.

(51) Int. Cl.
*F02M 22/00* (2006.01)

(52) U.S. Cl. ....................... 123/536; 123/538; 123/539; 60/274

(58) Field of Classification Search ......... 123/536–539; 60/272–324; 392/385–386
See application file for complete search history.

(56) References Cited

U.S. PATENT DOCUMENTS

| | | | | |
|---|---|---|---|---|
| 4,263,500 A | | 4/1981 | Springer et al. | |
| 4,316,077 A | | 2/1982 | Carlson | |
| 4,636,617 A | | 1/1987 | Petersen et al. | |
| 4,757,183 A | | 7/1988 | Karey et al. | |
| 5,039,865 A | | 8/1991 | Koji | |
| 5,044,346 A | * | 9/1991 | Tada et al. | 123/538 |
| 5,077,461 A | | 12/1991 | Hasegawa | |
| 5,388,177 A | * | 2/1995 | Ono et al. | 392/386 |
| 5,632,254 A | | 5/1997 | Kim | |
| 5,636,318 A | | 6/1997 | Polaert et al. | |
| 5,787,704 A | * | 8/1998 | Cravero | 60/274 |
| 5,964,205 A | * | 10/1999 | Tsai | 123/536 |
| 5,965,007 A | | 10/1999 | Uzawa | |
| 5,996,243 A | | 12/1999 | Chang et al. | |
| 6,026,788 A | | 2/2000 | Wey | |
| 6,058,698 A | * | 5/2000 | Coral et al. | 60/275 |
| 6,082,339 A | | 7/2000 | Wey | |
| 6,205,674 B1 | | 3/2001 | Kaizuka | |
| 6,205,677 B1 | | 3/2001 | Yune | |
| 6,244,254 B1 | * | 6/2001 | Chen | 123/536 |
| 6,263,865 B1 | * | 7/2001 | Koyama et al. | 123/536 |
| 6,285,828 B1 | | 9/2001 | Cafaro | |
| 6,378,225 B1 | | 4/2002 | Slingo | |
| 6,402,991 B1 | | 6/2002 | Itakura et al. | |
| 6,481,116 B1 | | 11/2002 | Slingo | |
| 6,640,049 B1 | * | 10/2003 | Lee et al. | 392/385 |

FOREIGN PATENT DOCUMENTS

| | | |
|---|---|---|
| EP | 1086630 | 3/2001 |
| EP | 1178206 | 2/2002 |
| EP | 1215273 | 6/2002 |
| JP | 08155441 2 | 6/1996 |
| JP | 2002112812 | 4/2002 |

OTHER PUBLICATIONS

International Search Report mailed Dec. 29, 2003 for PCT Application No. PCT/US03/24378, filed May 8, 2003.
U.S. Appl. No. 10/065,304, filed Oct. 1, 2002, Slingo.

* cited by examiner

*Primary Examiner*—Marguerite McMahon
(74) *Attorney, Agent, or Firm*—Wallenstein Wagner & Rockey, Ltd.

(57) ABSTRACT

Apparatuses, devices, systems and methods employing a material or combination of materials capable of emitting both far infared radiation and negative ions are provided. The material at least include a first part of, for example, a bio-ceramic, and a second part that includes an additional oxide material. The material can be used in a variety of different applications including, for example, internal engine combustion, natural gas combustion, water purification or the like.

49 Claims, 4 Drawing Sheets

APPARATUSES, DEVICES, SYSTEMS AND METHODS EMPLOYING FAR INFRARED RADIATION AND NEGATIVE IONS

CROSS REFERENCE TO RELATED APPLICATIONS

This patent application is a continuation-in-part of U.S. Pat. application Ser. No. 10/213,197, filed on Aug. 5, 2002 now abandoned herein incorporated by reference.

BACKGROUND OF THE INVENTION

Far infrared radiation (FIR) commonly refers to electromagnetic radiation that has a wave length between the visible light region and the microwave region of the electromagnetic spectrum. In general, FIR or other like terms as used herein refers to electromagnetic radiation that has a wavelength ranging from about 5.6 microns to about 1000 microns.

Certain types of ceramics containing silica oxide and aluminum oxide are known to radiate FIR at room temperature, and to radiate elevated levels of FIR when heated. For example, some types of these ceramics are commonly referred to as bio-ceramics because of reported biological and physiological effects attributed to such materials.

However, typical bio-ceramic materials do not emit negative ions at room temperature and are generally limited in their ability to do so unless subject to temperatures exceeding about 1000° F.

FIR-emitting bodies have been used in a variety of applications, such as increasing fuel efficiency, heating, ripening of fruit, deodorizing and inducing perspiration in humans. With respect to this latter use, FIR has been used in saunas as a substitute for traditional steam heat.

With respect to fuel efficiency applications, devices have been developed that introduce FIR to fuel in a non-contact fashion prior to introduction of the fuel into an engine. For example, U.S. Pat. Nos. 6,026,788 and 6,082,339 disclose a FIR emitting device that can be attached to a fuel line in a non-contact fashion. This purportedly can improve fuel efficiency, increase engine power, and reduce harmful exhaust emissions.

Materials are also known that possess a source material capable of emitting negative ions. These types of materials may be useful in industry and by consumers. For example, negative ions have been reported to possess antibacterial and deodorizing properties, and can be effective in removal of airborne pollutants, leaving behind clean and refreshed air. However, the application of negative ion technology can be problematic due to, for example, the fact that the application of the technology typically can require extensive modifications to existing processes, thus increasing costs associated with those processes.

Other materials are known, in general, that can emit both FIR and negative ions.

For example, U.S. Pat. No. 6,402,991 discloses a function-enhanced shaped ceramic article obtained by mixing a powder of a functional material of at least one species selected from the group consisting of a mineral, a metal and metallic compound and a powder of a far infrared radiating material composed of a ceramic composition that contains $SiO_2$ and $Al_2O_3$ in specified amounts. Preferably, the amount of the far infrared radiating material is at least 30% weight and not more than 90% weight. As disclosed, this amount of far infrared radiating material is necessary for the article to be easily shaped into a plate-like or a ball-like shaped article. The function-enhanced shaped ceramic article can be directly added to water for anti-bacterial purposes as disclosed in Example 1.

U.S. Pat. No. 5,965,007 discloses a method of preparing water for human consumption and/or use. As disclosed, the method includes submerging ceramics that have an extremely high emissivity of far infrared in water in a specified amount; placing an electrode in the water; and allowing the water to stand for a predetermined period of time, preferably at least 12 hours. The ceramics have such a composition that $SiO_2$, $Al_2O_3$, $Fe_2O_3$, $MnO_2$, ZnO and CoO are provided in specified concentrations.

Consequently, a need exists to provide improved devices, apparatuses, systems and methods employing both FIR radiating material and negative ion material, or a material that emits both FIR and negative Ions.

SUMMARY OF THE INVENTION

The present invention relates to devices, apparatuses, systems and methods of using material capable of emitting both FIR and negative ions and applying the same in a variety of suitable applications.

Applicant has become aware that, by combining material that radiates FIR with material that emits negative ions, or employing a material that emits both FIR and negative ions, in devices, apparatuses, systems and methods, enhanced results are achieved over devices, apparatuses, systems and methods employing only FIR emitting material.

In an embodiment, the material at least includes a two part material with a first part including a material component capable of emitting FIR and an additional material component including an oxide material. In an embodiment, the first part and the second part respectively include about 95% by weight or less and about 5% by weight or more of the material. It will be understood that, in place of material that has constituent components capable of emitting FIR and negative ions, respectively, that a material that emits both FIR and negative ions can be substituted. In an embodiment, the material can include a single material with one or more constituents or a combination of two or more materials.

In an embodiment, the present invention provides an apparatus capable of emitting both far infrared radiation and negative ions. The apparatus includes a conduit through which a fluid can flow; and a material capable of emitting both far infrared radiation and negative ions wherein the material is adaptedly coupled to the conduit such that an effective amount of the far infrared radiation and negative ions is introduced into the fluid flowing through the conduit.

The fluid can include gas, air, liquid, natural gas, water, a liquid fuel source, a gaseous fuel source, the like and combinations thereof associated with any suitable number of processes, such as internal engine combustion, natural gas combustion, water processes and/or the like. As applied, the material of the present invention can be effectively coupled to one or more components associated with the desired application. With respect to internal engine combustion, for example, the material can be coupled to a fuel line, an air intake, an exhaust system, other suitable fuel combustion components and combinations thereof. With respect to natural gas combustion, the material can be coupled to the gas intake and/or the like. This can provide an effective system for enhancing the operational efficiency of the process, such as by increasing fuel efficiency and reducing exhaust emissions as applied to combustion processes and applications thereof.

In another embodiment, the present invention provides a system for enhancing fuel combustion efficiency. The system includes a device including a fuel combustion engine having a conduit through which a fluid can flow; and a material capable of emitting both far infrared radiation and negative ions wherein the material is adaptedly coupled to the conduit such that an effective amount of the far infrared radiation and negative ions are introduced into the fluid flowing through the conduit.

In yet another embodiment, a device for an internal combustion engine having a fluid line through which fluid can flow is provided. The device includes a material capable of emitting far infrared radiation and negative ions wherein the material is so constructed and arranged such that the material substantially contacts at least a portion of the fluid line allowing an effective amount of the far infrared radiation and negative ions to be emitted into the fluid.

In still yet another embodiment, a fluid line for an internal combustion engine is provided that includes at least a portion of the fluid line and a material capable of emitting both far infrared radiation and negative ions adaptedly coupled to the portion of the fluid line allowing an effective amount of the far infrared radiation and the negative ions to be emitted into fluid passing through the fluid line during operation.

In a further embodiment, the present invention provides a method for increasing fuel efficiency of an internal combustion engine. The method includes the steps of coupling a device including a material capable of emitting far infrared radiation and negative ions to a fluid line of the internal combustion engine: operating the internal combustion engine; and emitting an amount of the far infrared radiation and negative ions into the fluid flowing through the fluid line effective to increase fuel efficiency during operation.

In still a further embodiment, the present invention provides a method of reducing exhaust emissions of an internal combustion engine. The method includes the steps of coupling a device including a material capable of emitting both FIR and negative ions to a fluid line of the internal combustion engine; operating the internal combustion engine; and emitting an amount of the FIR and negative ions into fluid flowing through the fluid line effective to reduce exhaust emissions during operation.

In yet a further embodiment, the present invention provides a method for enhancing natural gas combustion. The method includes the steps of coupling a device including a material capable of emitting far infrared radiation and negative ions to a natural gas combustion machine; operating the natural gas combustion machine; and emitting the far infrared radiation and negative ions into natural gas flowing into the machine in an effective amount to enhance combustion.

In still yet a further embodiment, the present invention provides a method for purifying water. The method includes the steps of providing a material capable of emitting both far infrared radiation and negative ions; adding the material in an effective amount to the water; and emitting far Infrared radiation and negative ions into the water.

In an embodiment, the present invention provides a method of purifying water. The method includes the steps of providing a material capable of emitting both far infrared radiation and negative ions; coupling the material to a water supply line through which water flows; and emitting the far infrared radiation and negative ions into the water as it flows through the water supply line.

An advantage of the present invention is to provide devices, apparatuses, systems and methods that employ material that radiate FIR and material that emits negative ions.

Another advantage of the present invention is to provide devices, apparatuses, systems and methods that employ material that is capable of emitting both FIR and negative ions.

Still another advantage of the present invention is the enhancement of fuel or natural gas processes with a substance capable of emitting FIR and negative ions or substances which together emit negative ions and FIR.

Still yet another advantage of the present invention is to provide improved water purification processes that employ material that emits FIR and negative ions or a combination of material that together emit FIR and negative ions.

A further advantage of the present invention is to provide devices, apparatuses, systems and methods that can reduce emissions produced during fuel combustion processes.

A still further advantage of the present invention is to provide devices, apparatuses, systems and methods that can enhance the fuel efficiency of fuel combustion processes.

Additional features and advantages of the present invention are described In, and will be apparent from, the following Detailed Description of the Invention and the figures.

DETAILED DESCRIPTION OF THE INVENTION

Figure 1:
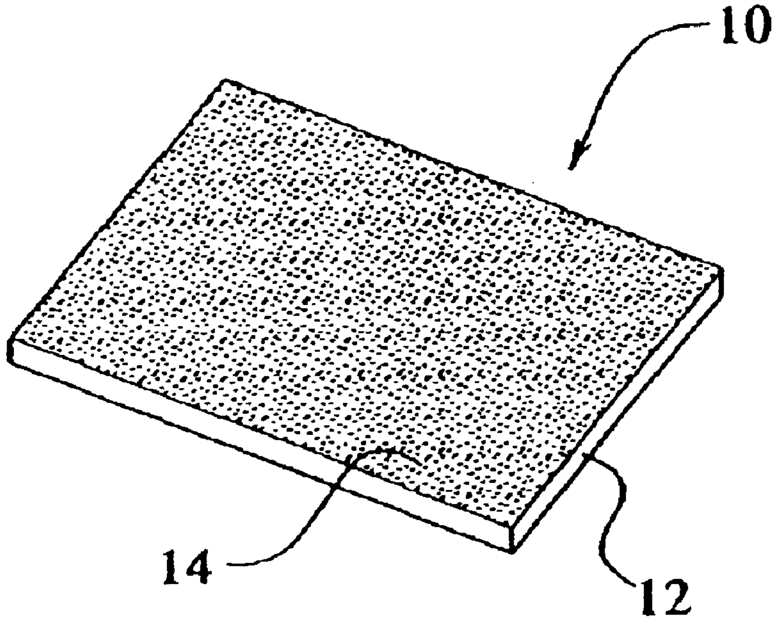
FIG. 1 is a perspective view of a device of an embodiment of the present invention.

The present invention generally relates to the use of material, or a combination of material, that emits FIR and negative ions. More specifically, the present invention is directed to employing ceramic material or combinations of ceramic material in a variety of different applications, including, for example, fuel combustion, natural gas combustion, water purification or other suitable types of processes.

Applicant believes that the present invention can enhance these and other types of processes by exposing the processes to an effective amount of both negative ions and FIR emitted by the material or combination of materials according to an embodiment of the present invention. Far infrared radiation is an energy source that can be characterized by its specific electromagnetic wave properties ranging from about 5.6 microns to about 1000 microns, preferably ranging from about 5.6 microns to about 25 microns. Negative ions, which are essentially negatively charged particles, are also an energy form.

In this regard, it is believed that the two part material energy source, or combination of energy sources, capable of emitting both FIR and negative ions can be adapted to have an enhanced activating effect on the process, such as on the combustion of liquid fuels or natural gas, or on the purification of water. As a result, fuel efficiency and/or a reduction in emissions can be realized, for example, as applied to fuel combustion processes. Further, the present invention can be made relative ease and can be adapted for use with relatively minor modifications to the existing processes, thus having little, if any, impact on the costs associated with such processes.

As previously mentioned, the present invention provides devices including material or combination of material capable of emitting both FIR and negative ions. In an embodiment, the material includes a first part capable of emitting FIR and a second part that includes an oxide material. Applicant believes that the combination of these material components provides improved properties as compared to known applications of ceramic materials.

In an embodiment, the material at least includes a first part and a second part. The first part and second part of the material of the present invention can be made of a variety of suitable materials. In an embodiment, the FIR-emitting material of the first part is composed of a bio-ceramic material. The bio-ceramic material can include, for example, silicon oxide ($SiO_2$), aluminum oxide ($Al_2O_3$), iron oxide ($Fe_2O_3$) magnesium oxide (MgO) and other suitable constituents, derivatives thereof or combinations thereof. These materials are commercially available or can be manufactured in any known and suitable way. It should be appreciated that the bio-ceramic material can include any suitable amount of the constituents.

The second part or additional oxide material includes, in an embodiment, iron oxide, silicon oxide, titanium oxide ($TiO_2$), aluminum oxide, magnesium oxide and other suitable materials, derivatives thereof or combinations thereof. The additional oxide material is commercially available. The additional oxide materials can also be manufactured according to known procedures. It should be understood, however, that the ratio of bio-ceramic material to the additional oxide material can vary depending on the desired application. In an embodiment, the material of the present invention includes about 95% by weight or less of the bio-ceramic material and about 5% by weight or more of the additional oxide material. Preferably, the bio-ceramic part includes about 70% by weight or more of silicon oxide, about 20% by weight or more of aluminum oxide, about 3% by weight or more of iron oxide, and about 2% by weight or more of magnesium oxide.

It should be appreciated that the emitting material of the present invention can be processed into a variety of different and suitable sizes, including the production of small-gauge particulates or powders. In general, as the particle size of the material is decreased and/or the surface area is increased, the emitting properties of the present invention can be optimized. While the FIR/negative ion emitting substance is a necessary component of the present invention, other materials optionally can be mixed with or added to the emitting substance. Other such optional substances may include, for example, binders, fillers and/or other suitable solid material substances.

The emitting substances can be attached to, or incorporated with, a variety of other substances that will serve as substrates or supports to facilitate adaptation of the material for use. For example, the emitting substance can be processed into a powder/particulate form and adhered to or incorporated onto a flexible substrate as described below and shown in FIGS. 1 and 2. While it is preferred that such a flexible substrate be made of cloth or other like textile material, other flexible, wrappable, and/or moldable materials can include, for example, rubber, plastic, other suitable polymeric substances and/or the like. If a flexible substrate is employed, it may be desirable to use a substrate that has elastomeric properties as this may allow for the device to be more securely and easily placed in position.

FIR/negative ion emitting substances can also be adhered to or incorporated with components that are more rigid as compared to flexible substrates described above depending on the application. A number of suitable rigid components of varying shapes and sizes can be used that are made from materials including, for example, metals and high viscosity polymeric materials, and/or the like.

Figure 3:
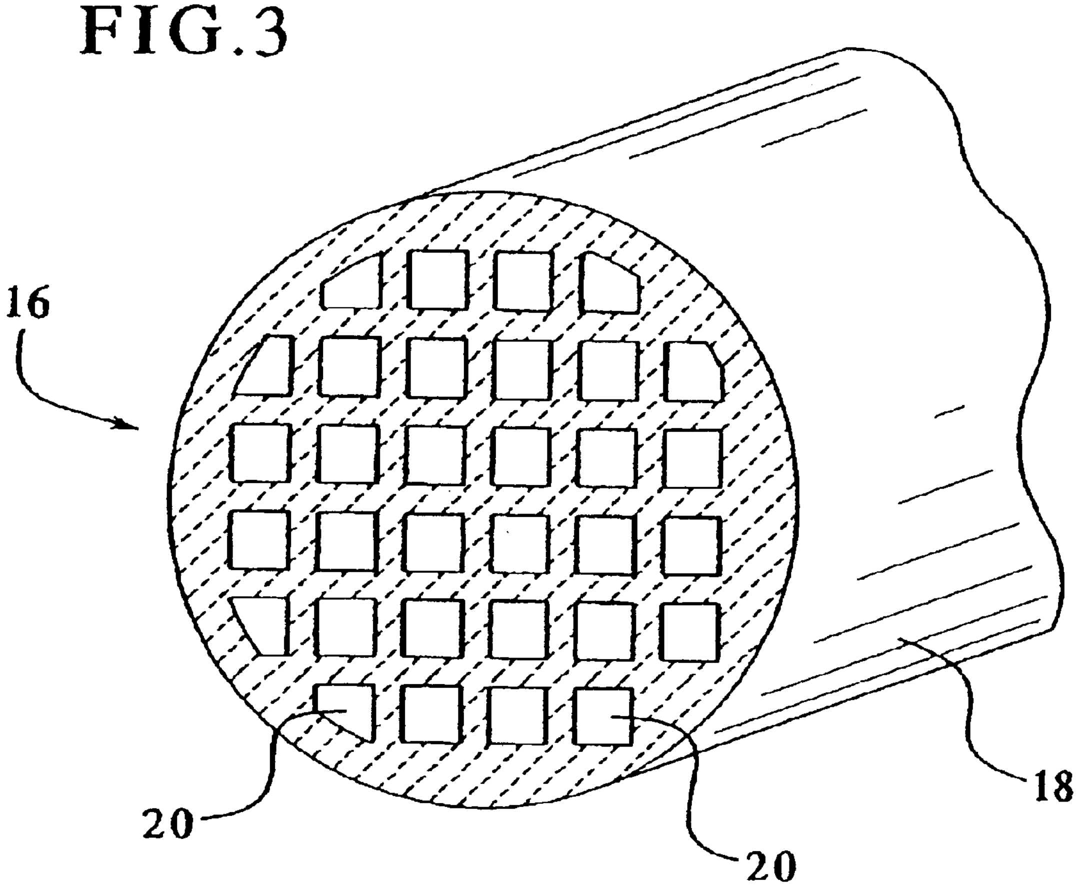
FIG. 3 is a sectional view of a FIR/negative ion emitting body according to an embodiment of the present invention.

In an embodiment, the FIR/negative ion emitting material is configured as a material body formed into a variety of suitable shapes and sizes. For example, the FIR/negative ion emitting material has a generally cylindrical shape with a plurality of apertures through which air, water and/or other like medium can flow as illustrated in FIG. 3 and discussed below in greater detail.

As previously discussed, the present invention provides devices that employ materials capable of emitting both FIR and negative ions. The devices can be utilized in a variety of different applications and can be adapted for use in a variety of suitable ways to facilitate operation of such applications. In an embodiment, the device can be used to facilitate the operation of a fuel combustion internal engine. The fuel includes any suitable liquid fuel source including, for example, gasoline, gasoline substitutes, the like or combinations thereof. As applied, the devices of the present invention, in an embodiment, are attached to a component of the engine, such as, the fuel line, the air intake line and/or the like in a non-contact fashion such that the device Is secured to the exterior of the fuel line and/or air intake line, and thus not contacting the liquid fuel source. By way of example and not limitation, securing of the device to the internal engine component can be achieved by wires, straps, clamps, rivets, hardware employing mated threads, and/or other like fastening mechanisms depending on the application. The fastening mechanisms can be made from any suitable materials, preferably materials that allow the device to be tightly secured in place such that the device remains effectively immobile during operation.

It should be appreciated that the FIR/negative ion emitting material of the present invention can be adapted to directly contact any suitable process medium, such as air, fuel, water and/or the like thereof. For example, the FIR/negative ion material in an embodiment formed as shown in FIG. 3 can be inserted into or otherwise placed in contact with the exhaust pipe of a device powered by a fuel combustion engine, such as an automobile or the like, as discussed in greater detail below.

In an embodiment, the present invention provides devices, apparatuses, systems and methods that can enhance the operational efficiency of an internal combustion engine and applications thereof by exposing both FIR and negative ions emitted by materials to the fuel prior to combustion and/or the air supply as it flows to, through and from the engine during use. As previously discussed, the present invention can be adapted for use in a number of different ways. In an embodiment, it Is preferable to place the FIR/negative ion emitting material of the present invention on, in, near or around a section of the fuel line and/or an air intake line. In this regard, it is preferred that the FIR/negative ion emitting substance substantially contacts at least a portion of the exterior of the fuel line section and/or air intake line section.

Although the material of the present invention can be secured in place in a variety of ways, it is preferred that this be achieved without the necessity of modifying the component, such as the air line, fuel line and/or the like, itself. Nevertheless, the present invention can be practiced by making modifications to any suitable component part associated with the combustion engine depending on the application of the present invention. Such modifications to the component(s) of the combustion engine and applications thereof can involve those changes necessary to position and/or secure the material of the present invention, or can involve modifying the design of the component to Incorporate FIR/negative ion emitting materials with the component.

For example, it may be desirable to manufacture a fuel line, air intake line and/or the like whereby a FIR/negative ion emitting material or combination of materials is already integrated with the component prior to installation of same. Such designs could, for example, have the emitting substance or substances incorporated in the exterior of the component, incorporated within the interior of the component, and/or the like. Alternatively, a section of the component could be replaced with the FIR/negative Ion emitting material in an embodiment of the present invention. It should be appreciated that the present invention can be secured onto the component in a single piece or a multiple number of pieces can be positioned and secured to the component, such as the fuel line, air intake line and/or the like.

Figure 2:
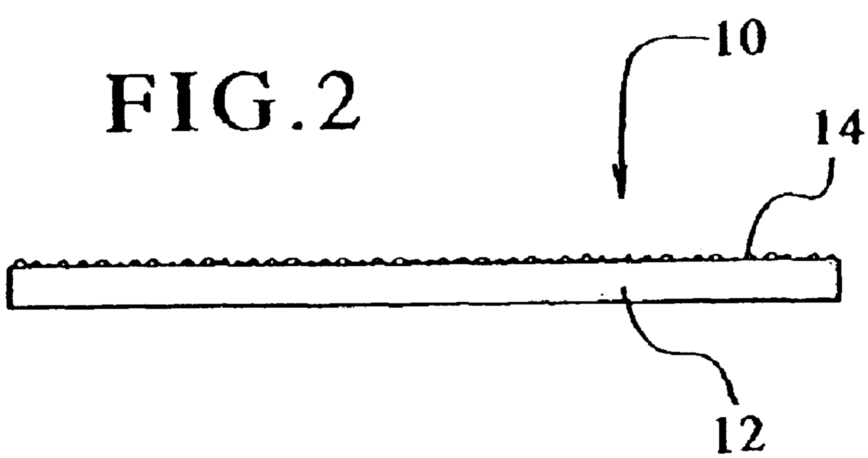
FIG. 2 is a sectional view of the device of FIG. 1 according to an embodiment of the present invention.

FIGS. 1 and 2 how a perspective view and a cross-sectional view, respectively, of a device 10 of the present invention. In this embodiment of the present invention, a fabric substrate 12 is provided. The fabric substrate can be made of any substantially flexible material. Adhered to one side of the fabric substrate 12 is a powdered ceramic material 14 that can emit both FIR and negative ions made in accordance with an embodiment of the present invention.

FIG. 3 illustrates a perspective view of a FIR/negative ion emitting material shaped into an emitting body 16. As illustrated in FIG. 3, the emitting body 16 has a generally cylindrical shape 18 with a plurality of apertures 20 through which air, water, fuel and/or other like medium can flow. In an embodiment, the apertures 20 can be generally square in shape and spaced apart to form a cross-shaped pattern.

It should be appreciated that the apertures 20 and the emitting body 16 can be formed Into any suitable shape and size depending on the application thereof. For example, the apertures can be shaped into any suitable geometrical or non-geometrical shape wherein the number, size and/or positions of like can vary to form any suitable pattern.

Figure 4:
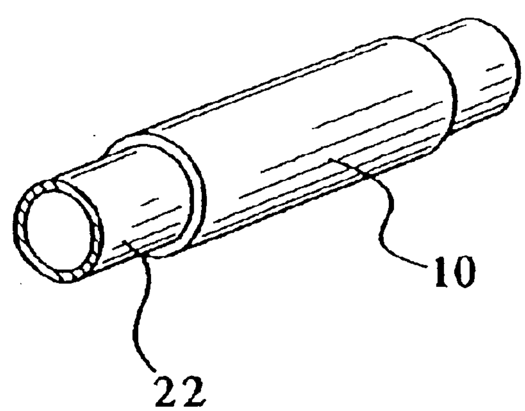
FIG. 4 is a perspective view of the device of FIG. 1 as shown wrapped around a component of an internal combustion engine according to an embodiment of the present invention.

FIG. 4 shows a perspective view of the device 10 of FIGS. 1 and 2 as wrapped around the exterior of a component 22 of an internal combustion engine (not shown). The component 22 can include any suitable part, such as a fuel line, an air line and/or the like. In FIG. 4, the ceramic material 14 is hidden from view as the side of the device 10 containing the ceramic material 14 is contacting the exterior of the component 22. When positioned in the manner shown in FIG. 4, FIR and negative ions can be emitted from the device 10 in an inward direction whereupon it can penetrate the component 22 and make contact with the fuel, air and/or the like therein. The component 22 can include any suitable component, such as a fuel line, an air intake line and/or the like.

Figure 5:
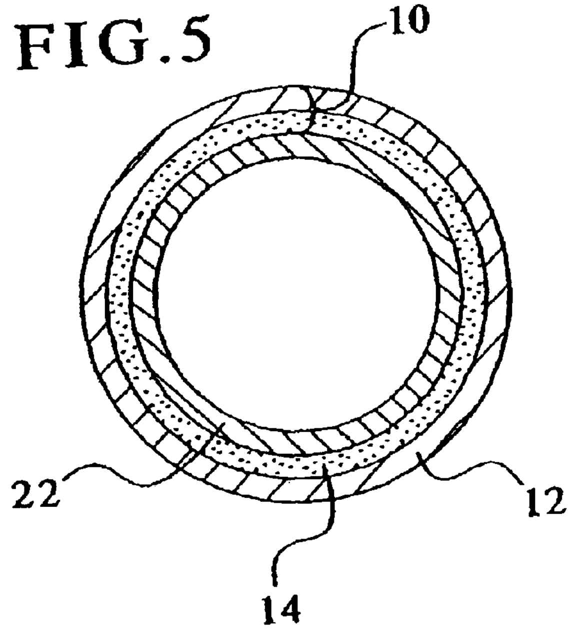
FIG. 5 is a sectional view of FIG. 4 according to an embodiment of the present invention.

FIG. 5 shows a sectional view of the device 10 of FIGS. 1 and 2 as wrapped around the exterior of the component 22 of an internal combustion engine. In this figure, the ceramic material 14 of the device 10 can be seen substantially contacting the external surface of the component 22.

Figure 6:
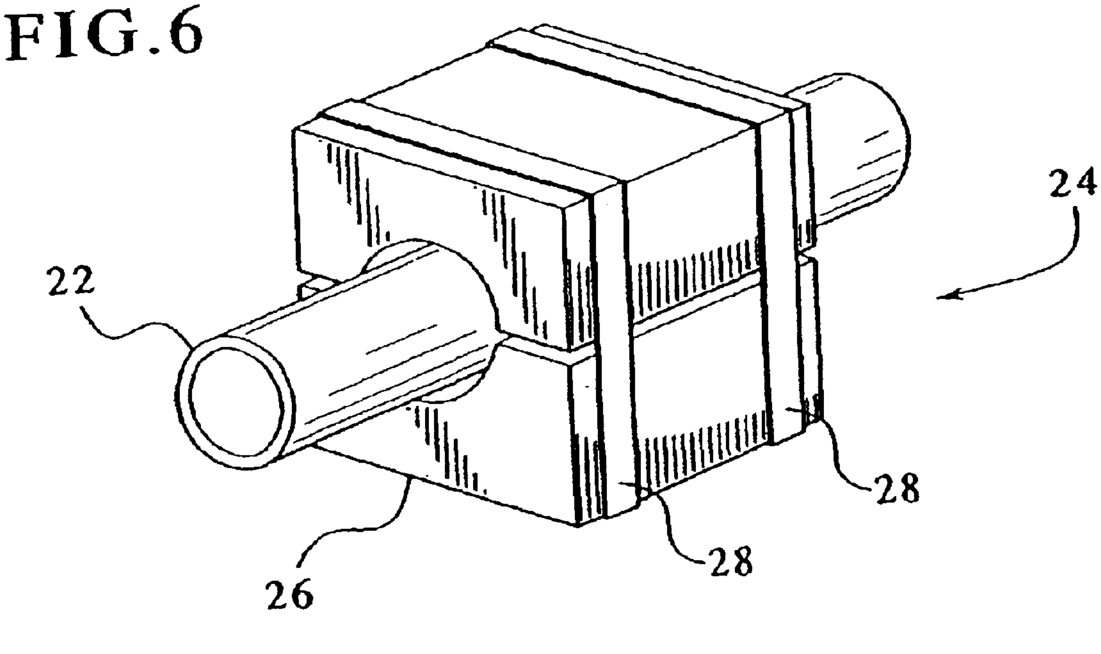
FIG. 6 is a perspective view of a device according to another embodiment of the present invention.

FIG. 6 shows a perspective view of a device 24 according to another embodiment of the present invention whereby a FIR/negative ion emitting ceramic material or combination of materials 26 is fashioned into a rigid body and positioned around the exterior of the component 22 of an internal combustion engine. In an embodiment, the device 24 is secured to the component 22 with two straps 28, preferably the straps 28 include a VELCRO fastening mechanism (not shown) to ensure the device 24 remains securely attached to the component 22 during use. Any suitable other fastening mechanism can be used. It should be appreciated that the rigid body can be formed into any suitable size and shape including a square-shaped rigid body as shown in FIG. 6 or other suitable geometrical or non-geometrical shapes depending on the application thereof.

Figure 7:
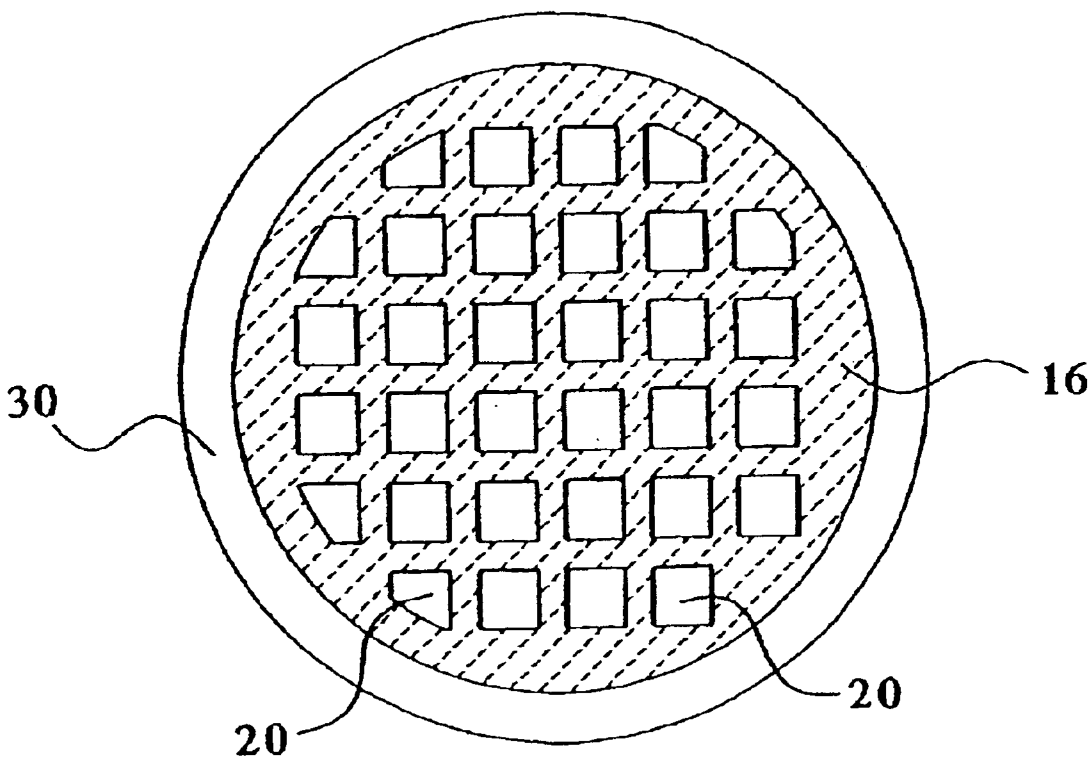
FIG. 7 is a sectional view of a FIR/negative ion emitting body inserted within an exhaust line associated with an internal combustion engine according to an embodiment of the present invention.

In an embodiment, the FIR/negative ion emitting material body 16 as shown in FIG. 3 can be inserted into an exhaust line 30 or the like coupled to a fuel combustion engine (not shown). The exhaust line 30 can be formed in any suitable way, such as exhaust pipe of an automobile. The material emitting body 16 of the present can be fitted into the exhaust line 30 or into a sectional part connectable (not shown) to the exhaust line 30 in any suitable way. As shown in FIG. 7, the material emitting body 16 of the present invention substantially contacts an interior surface of the exhaust line 30 or the like. Alternatively, the FIR/negative ion emitting material can be secured to the exterior of the exhaust pipe as is discussed above with reference to, example, FIGS. 1–6.

As previously discussed, the present invention can increase fuel efficiency and reduce exhaust emissions as applied to fuel combustion engine applications. In this regard, increased fuel efficiency and decreased exhaust emissions can be achieved by attaching the FIR/negative ion emitting ceramic material of the present invention to one or more components of the fuel combustion engine and applications thereof.

For example, the FIR/negative ion emitting material can be adapted to a fuel line, an air line, an exhaust line and/or other components of the combustion engine and applications thereof. In this regard, the present invention can provide an entire system for enhancing the operational efficiency of fuel combustion and other suitable processes, such as by reducing exhaust emissions and/or increasing fuel efficiency as applied to fuel combustion processes.

It should be appreciated that the present invention can be applied to a variety of different and suitable internal combustion engines used in countless industrial and consumer applications. By way of example and not limitation, internal combustion engines can include the principal type of engines used in trucks, automobiles, lawn mowers, air compressors, tractors, farm equipment, construction equipment and/or any suitable other device that employs an internal combustion engine operable by a liquid fuel source, such as gasoline. Preferably, the devices and methods of the present Invention can be used to Increase fuel efficiency and/or decrease exhaust emissions in trucks, automobiles, farm equipment, construction equipment, lawn equipment, such as lawn mowers, and other motorized vehicles. These and other related types of motorized vehicles and machines account for a significant amount of the world's fuel consumption and pollution.

It should be appreciated that the devices, apparatuses and systems employing FIR/negative emitting material or combination of materials of the present invention can be applied in a variety of different applications in addition to its application with fuel-operated internal combustion engines. For example, devices including the FIR/negative ion emitting material or combination of materials can increase fuel efficiency and reduce emissions associated with natural gas combustion processes. The devices, systems and apparatuses can be adapted in any suitable way as applied to natural gas operations, such as natural gas heating operations. For example, devices, system and apparatuses similar in design and construction as previously discussed can be adapted to natural gas combustion processes.

In an embodiment, the FIR/negative ion emitting material or combination of materials can be placed into a columnated or other like structure into which the material can be arranged in a packed-bed configuration (not shown). This can be coupled to a gas processing line or other like component of the natural gas combustion process in any suitable fashion allowing the gas to flow through the porous structure of the material in the packed-bed arrangement. Similar to its effects on internal combustion engine fuels, it is believed that the combination of FIR and negative ions have an activating effect on natural gas such that it can burn more efficiently and with less emissions.

In an embodiment, the devices, systems and apparatuses containing the FIR/negative ion emitting material or combination of materials can be applied to water purification. The material of the present invention can be adapted for water purification in any suitable water medium. In an embodiment, an effective amount of the material can be added directly to the water stream in any suitable way thereby enhancing water purification. However, the FIR/negative ion emitting material and/or combination of materials can be adapted for use in any suitable way in addition to or in combination with introducing the FIR/negative ion emitting material(s) directly into the water stream.

For example, devices, systems and apparatuses similar in design and construction as previously discussed can be adapted to purify water. In an embodiment, a powdered form of the FIR/negative ion emitting material(s) can be adhered to a support member, such as an elasticized material including fabric or other suitable textile that can be elasticized. The support member can be placed around a fluid conduit, such as a water supply line, such that the FIR/negative ion emitting material (s) substantially contacts the outer surface of the water supply line. The support can be secured to the water line in any suitable way such that FIR and negative ions can be effectively introduced into the water stream flowing through the supply line.

While it is known that the alkalinity of water can be affected by exposure of the water to FIR radiation, alkalinity adjustment of the water occurs only after several hours after exposure to the FIR emissions. Conversely, by passing a stream of water through the devices, systems and apparatuses of the present invention, which exposes the water to negative ions as well as FIR, the alkalinity of the water is immediately affected. Further, it is believed that the introduction of the FIR and negative ions into the water stream can result in neutralization of a number of suitable constituents desired to be removed from the water, such as biological matter, inorganics including metals and salts thereof, matter, organic matter, the like or combinations thereof. It should be appreciated that the material can be applied to any suitable type of aqueous or water-based process or process stream, including for example, recreational, industrial or other suitable applications.

By way of example and not limitation, examples of the present invention will now be given.

Example 1

A FIR/Negative ion emitting ceramic material in the form of a powder was adhered to a piece of elasticized fabric. The fabric was wrapped around and secured to a fuel line of a motor vehicle, thus allowing the material to substantially contact the exterior of a portion of the fuel line. The elasticized fabric device was secured in place with Velcro™ straps according to an embodiment of the present invention. The motor vehicle used for this test was a 2003 Acura 3.2L TL Type S.

The motor vehicle was road tested over a period of about one and half months. As indicated below in Table 1, the fuel consumption was measured after driving a certain amount of miles to determine the fuel efficiency in miles per gallon ("MPG"): [t1]

TABLE 1A

| Miles | Gallons | MPG |
|---|---|---|
| 165.4 | 7.082 | 23.35 |
| 183.6 | 7.22 | 25.429 |
| 173.4 | 8.03 | 21.59 |
| 154.1 | 7.22 | 21.343 |
| 229.4 | 11.03 | 20.797 |
| 210.9 | 9.41 | 22.41 |
| 142.8 | 6.73 | 21.218 |
| 259.7 | 10.37 | 25.043 |
| 226.5 | 10.98 | 20.628 |

This test was conducted using the same type of gasoline from the same gas station. The gasoline was a premium grade fuel. The miles driven included about 50% to about 60% highway driven miles at an average speed of about 75 miles per hour. The mean value for miles per gallon over the test period based on the results of Table1A was 22.42 MPG. In comparison, motor vehicles of the same model and make as the tested motor vehicle, in general, are known to achieve 17 to 18 miles per gallon during general use.

Example 2

The FIR/negative ion emitting material of the present invention was tested to demonstrate its effectiveness on the reduction of exhaust emissions. A FIR/negative ion emitting material was coupled to the fuel line of a motor vehicle similar to the FIR/negative ion emitting material of Example 1 pursuant to an embodiment of the present invention. The motor vehicle used for this test was a 1986 Honda Accord with a 2.0 Liter, 4 cylinder engine and automatic transmission. The emission tests were conducted at a certified emission test station in Illinois. The car was initially emission tested without the FIR/negative ion emitting material. At that time, the recorded mileage for the car was about 237,000. The FIR/negative ion emitting material was then coupled to the fuel line of the car as discussed above and again emission tested. The results of the emission tests are indicated below in Table 2A. [t2]

TABLE 2A

| Test | Initial | FIR/Negative Ion Emitting Material |
|---|---|---|
| CO Emissions Reading (3.804 gram standard) | 0.571 | 0.459 |
| Hydrocarbon Emissions Reading (0.407 gram standard) | 0.233 | 0.090 |
| $CO_2$ Emissions Reading (grams) | 0.581 | 0.647 |

The test results demonstrate that the emission levels of the initial test were significantly decreased when the FIR/negative ion emitting material was coupled to the fuel line of the test car. Further, the emission levels are well below the standard emission levels for CO and hydrocarbon emissions.

Example 3

A FIR/Negative ion emitting ceramic material in the form of a powder was adhered to a piece of elasticized fabric. The fabric was wrapped around and secured to a water supply line, thus allowing the material to substantially contact the exterior of a portion of the supply line. The elasticized fabric device was secured in place with Velcro™ straps according to an embodiment of the present invention.

Prior to securing the device of the present invention to the water supply line, the alkalinity and redox potential of the water was measured as being 7.21 pH and +86, respectively. Following securing the device of the present invention to the water supply line, the alkalinity and redox potential of water passing through the line was immediately measured as being 8.3 Ph and −61, respectively. After several hours, the alkalinity and redox potential measurements of the water stabilized at 8.8 pH and −100, respectively.

It should be understood that various changes and modifications to the presently preferred embodiments described herein will be apparent to those skilled in the art.

Such changes and modifications can be made without departing from the spirit and scope of the present invention and without diminishing its intended advantages. It is therefore intended that such changes and modifications be covered by the appended claims.

What is claimed is:

1. An apparatus capable of emitting both far infrared radiation and negative ions, the apparatus comprising:

a conduit through which a fluid can flow; and a material capable of emitting both far infrared radiation and negative ions wherein the material includes a FIR/negative ion material emitting body having a generally cylindrical shape with a plurality of apertures through which the fluid can flow and is adaptedly coupled to the conduit such that an effective amount of far infrared radiation and negative ions is introduced into the fluid flowing through the conduit.

2. The apparatus of claim 1, wherein the fluid is selected from the group consisting of a gas, air, a liquid, natural gas, water, a liquid fuel source, a gaseous fuel source and combinations thereof.

3. The apparatus of claim 1, wherein the material is selected from the group consisting of a single material having one or more constituents and a combination of two or more materials.

4. The apparatus of claim 1, wherein the material includes a first part including a bio-ceramic in an amount of about 95% by weight or less and a second part including a ceramic oxide in an amount of about 5% by weight or more.

5. The apparatus of claim 4, wherein the first part comprises at least one compound selected from the group consisting of silicon oxide, aluminum oxide, iron oxide, magnesium oxide, derivatives thereof and combinations thereof.

6. The apparatus of claim 4, wherein the ceramic oxide is selected from the group consisting of iron oxide, silicon oxide, titanium oxide, aluminum oxide, magnesium oxide, derivatives thereof and combinations thereof.

7. The apparatus of claim 1, wherein the conduit is selected from the group consisting of a fuel line, a gas line, an air line, an exhaust pipe and combinations thereof.

8. A system for enhancing fuel combustion efficiency, the system comprising:

a device including a fuel combustion engine having a conduit through which a fluid can flow; and a material capable of emitting both far infrared radiation and negative ions wherein the material includes a FIR/negative ion material emitting body having a generally cylindrical shape with a plurality of apertures through which the fluid can flow and is adaptedly coupled to the conduit such that an effective amount of far infrared radiation and negative ions is introduced into the fluid flowing through the conduit.

9. The system of claim 8, wherein the fluid is selected from the group consisting of a gas, air, a liquid, natural gas, water, a liquid fuel source, a gaseous fuel source and combinations thereof.

10. The system of claim 8, wherein the material is selected from the group consisting of a single material having one or more constituents and a combination of two or more materials.

11. The system of claim 8, wherein the material includes a first part including a bio-ceramic in an amount of about 95% by weight or less and a second part including a ceramic oxide in an amount of about 5% by weight or more.

12. The system of claim 11, wherein the first part comprises at least one compound selected from the group consisting of silicon oxide, aluminum oxide, iron oxide, magnesium oxide, derivatives thereof and combinations thereof.

13. The system of claim 11, wherein the ceramic oxide is selected from the group consisting of iron oxide, silicon oxide, titanium oxide, aluminum oxide, magnesium oxide, derivatives thereof and combinations thereof.

14. The system of claim 8, wherein the conduit is selected from the group consisting of a fuel line, an air line, an exhaust line and combinations thereof.

15. The system of claim 8, wherein the device is selected from the group consisting of an automobile, a truck, farm equipment, lawn equipment, construction equipment and combinations thereof.

16. A device for an internal combustion engine having a fluid line through which fluid can flow, the device comprising a material capable of emitting far infrared radiation and negative ions wherein the material includes a FIR/negative ion material emitting body having a generally cylindrical shape with a plurality of apertures through which the fluid can flow and is constructed and arranged such that the material substantially contacts at least a portion of the fluid line allowing an effective amount of far infrared radiation and negative ions to be emitted into the fluid.

17. The device of claim 16, wherein the material is selected from the group consisting of a single material having one or more constituents and a combination of two or more materials.

18. The device of claim 16, wherein the material includes a first part including about 95% by weight or less of a bio-ceramic and a second part including a ceramic oxide in an amount of about 5% by weight or more.

19. The device of claim 18, wherein the first part comprises at least one compound selected from the group consisting of silicon oxide, aluminum oxide, iron oxide, magnesium oxide, derivatives thereof and combinations thereof.

20. The device of claim 18, wherein the ceramic oxide is selected from the group consisting of iron oxide, silicon oxide, titanium oxide, aluminum oxide, magnesium oxide, derivatives thereof and combinations thereof.

21. The device of claim 16, wherein the device includes a substrate onto which the material is applied such that the material substantially contacts at least a portion of an exterior of the fluid line.

22. The device of claim 21, wherein the substrate is selected from the group consisting of a fabric, a polymer, a metal, an alloy, glass and combinations thereof.

23. The device of claim 16, wherein the material is shaped into a rigid body such that the material is adaptedly coupled to the internal combustion engine allowing fluid within the fluid line to be exposed to an effective amount of far infrared radiation and negative ions prior to combustion.

24. The device of claim 16, wherein the internal combustion engine powers a motorized vehicle selected from the group consisting of an automobile, a truck, farm equipment, lawn equipment, construction equipment and combinations thereof.

25. The device of claim 24, wherein the device is capable of enhancing fuel efficiency of the motorized vehicle.

26. The device of claim 24, wherein the device is capable of reducing emissions during operation of the motorized vehicle.

27. The device of claim 16, wherein the fluid is selected from the group consisting of a gas, air, a liquid, natural gas, water, a liquid fuel source, a gaseous fuel source and combinations.

28. The device of claim 16, wherein fluid line is selected from the group consisting of a fuel line, a gas line, an air line, an exhaust line and combinations thereof.

29. The device of claim 16, wherein the FIR/negative ion material emitting body is insertable within an exhaust line associated with the internal combustion engine.

30. A fluid line for an internal combustion engine comprising:

at least a portion of the fluid line and a material capable of emitting both far infrared radiation and negative ions wherein the material includes a FIR/negative ion material emitting body having a generally cylindrical shape with a plurality of apertures through which the fluid can flow and is adaptedly coupled to the portion of the fluid line allowing an effective amount of the far infrared radiation and the negative ions to be emitted into fluid passing through the fluid line during operation.

31. The fluid line of claim 30, wherein the material is selected from the group consisting of a single material having one or more constituents and a combination of two or more materials.

32. The fluid line of claim 30, wherein the material includes a first part including a bio-ceramic in an amount of about 95% by weight or less and a second part including a ceramic oxide in an amount of about 5% by weight or more.

33. The fluid line of claim 32, wherein the first part comprises at least one compound selected from the group consisting of silicon oxide, aluminum oxide, iron oxide, magnesium oxide, derivatives thereof and combinations thereof.

34. The fluid line of claim 32, wherein the ceramic oxide is selected from the group consisting of iron oxide, silicon oxide, titanium oxide, aluminum oxide, magnesium oxide, derivatives thereof and combinations thereof.

35. The fluid line of claim 30 wherein the material is an integral part of the fluid line.

36. The fluid line of claim 30 wherein the material is a separate component of the fluid line attached to the portion of the fluid line in substantial contact to at least one of an interior and exterior thereof.

37. The fluid line of claim 30, wherein the fluid line is selected from the group consisting of a gas line, a fuel line, an air line, an exhaust line and combinations thereof.

38. A method for increasing fuel efficiency of an internal combustion engine comprising the steps of:

coupling a device including a material capable of emitting far infrared radiation and negative ions wherein the material includes a FIR/negative ion material emitting body having a generally cylindrical shape with a plurality of apertures through which the fluid can flow to a fluid line of the internal combustion engine;

operating the internal combustion engine; and emitting an amount of far infrared radiation and negative ions into the fluid flowing through the fluid line effective to increase fuel efficiency during operation.

39. The method of claim 38, wherein the material at least includes about 95% or less by weight of a bio-ceramic material and about 5% by weight or less of an oxide material selected from the group consisting of iron oxide, silicon oxide, titanium oxide, aluminum oxide, magnesium oxide, derivatives thereof and combinations thereof.

40. The method of claim 38, wherein the material is selected from the group consisting of a single material having one or more constituents, and a combination of two or more materials.

41. The method of claim 38, wherein the device is attached around a portion of an exterior of the fluid line.

42. The method of claim 41, wherein the fluid line is selected from the group consisting of an air line, a gas line, a fuel line, an exhaust line and combinations thereof.

43. The method of claim 42, wherein the material is inserted into the exhaust line.

44. A method of reducing exhaust emissions of an internal combustion engine comprising the steps of:

coupling a device including a material capable of emitting both FIR and negative ions wherein the material includes a FIR/negative ion material emitting body having a generally cylindrical shape with a plurality of apertures through which the fluid can flow to a fluid line of the internal combustion engine;

operating the internal combustion engine; and emitting an amount of the FIR and negative ions into fluid flowing through the fluid line effective to reduce exhaust emissions during operation.

45. The method of claim 44, wherein the material at least includes about 95% or less by weight of a bio-ceramic material and about 5% by weight or less of an oxide material selected from the group consisting of iron oxide, silicon oxide, titanium oxide, aluminum oxide, magnesium oxide, derivatives thereof and combinations thereof.

46. The method of claim 44, wherein the material is selected from the group consisting of a single material with one or more constituents, and a combination of two or more materials.

47. The method of claim 44, wherein the device is flexibly wrapped around an exterior of the fluid line.

48. The method of claim 44, wherein the material is inserted into the exhaust line.

49. The method of claim 46, wherein the fluid line is selected from the group consisting of an air line, a gas line, a fuel line, an exhaust line and combinations thereof.

* * * * *